US010780821B2

(12) United States Patent
Michalakis et al.

(10) Patent No.: US 10,780,821 B2
(45) Date of Patent: Sep. 22, 2020

(54) SYSTEM FOR ALERTING A VEHICLE OCCUPANT TO A GROUND SURFACE CONDITION ADJACENT A VEHICLE DOOR

(71) Applicant: Toyota Research Institute, Inc., Los Altos, CA (US)

(72) Inventors: Nikolaos Michalakis, Saratoga, CA (US); Julian M. Mason, Redwood City, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 382 days.

(21) Appl. No.: 15/865,889

(22) Filed: Jan. 9, 2018

(65) Prior Publication Data

US 2019/0210518 A1 Jul. 11, 2019

(51) Int. Cl.
| | |
|---|---|
| *B60Q 1/50* | (2006.01) |
| *E05B 81/16* | (2014.01) |
| *B60Q 9/00* | (2006.01) |
| *E05B 81/64* | (2014.01) |
| *G06K 9/00* | (2006.01) |
| *B60K 35/00* | (2006.01) |

(52) U.S. Cl.
CPC .............. *B60Q 1/50* (2013.01); *B60K 35/00* (2013.01); *B60Q 1/503* (2013.01); *B60Q 9/00* (2013.01); *E05B 81/16* (2013.01); *E05B 81/64* (2013.01); *G06K 9/00791* (2013.01); *B60K 2370/16* (2019.05); *B60K 2370/178* (2019.05)

(58) Field of Classification Search
CPC combination set(s) only.
See application file for complete search history.

(56) References Cited

U.S. PATENT DOCUMENTS

| | | | |
|---|---|---|---|
| 2010/0211267 A1 | 8/2010 | Shimazaki et al. | |
| 2012/0065858 A1* | 3/2012 | Nickolaou | B60Q 9/008 701/70 |
| 2012/0194356 A1* | 8/2012 | Haines | G08G 1/161 340/933 |
| 2012/0229645 A1* | 9/2012 | Yamada | B60Q 1/2665 348/148 |
| 2014/0257630 A1 | 9/2014 | Ruiz et al. | |
| 2016/0280126 A1 | 9/2016 | Tanaka | |
| 2017/0356769 A1* | 12/2017 | Williams | G01D 11/30 |

* cited by examiner

*Primary Examiner* — Abby Y Lin
*Assistant Examiner* — Renee LaRose
(74) *Attorney, Agent, or Firm* — Christopher G. Darrow; Darrow Mustafa PC

(57) ABSTRACT

A computing system for a vehicle includes one or more processors for controlling operation of the computing system, and a memory for storing data and program instructions usable by the one or more processors. The one or more processors are configured to execute instructions stored in the memory to process sensor information to determine a condition of a portion of a ground surface adjacent at least one door opening of the vehicle, and to control an operation of the vehicle responsive to the condition of the portion of the ground surface adjacent the at least one door opening of the vehicle.

16 Claims, 6 Drawing Sheets

SYSTEM FOR ALERTING A VEHICLE OCCUPANT TO A GROUND SURFACE CONDITION ADJACENT A VEHICLE DOOR

TECHNICAL FIELD

The present disclosure relates to vehicles and, more particularly, to a system for determining a condition of a portion of a ground surface adjacent a door of a vehicle.

BACKGROUND

A moving vehicle may stop in any of a wide variety of locations, weather conditions, and ground surfaces. When the vehicle stops, any of a variety of ground surface conditions may exist adjacent doors of the vehicle where vehicle occupant may need to exit the vehicle. For example, patches of ice, water puddles, depressions in the ground, parking bumpers, and other features of the ground surface adjacent the door opening may present potential inconveniences or hazards to an occupant exiting the vehicle. The occupants may be unaware of such conditions until they actually exit the vehicle.

SUMMARY OF THE INVENTION

In one aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to: process sensor information to determine a condition of a portion of a ground surface adjacent at least one door opening of the vehicle; and control an operation of the vehicle responsive to the condition of the portion of the ground surface adjacent the at least one door opening of the vehicle.

In another aspect of the embodiments described herein, a ground surface condition information system for a vehicle is provided. The information system includes a ground surface condition determination system configured to determine a condition of a portion of a ground surface adjacent at least one door opening of a vehicle, and to control operation of a vehicle alert system responsive to the condition of the portion of the ground surface adjacent the door opening of the vehicle. The round surface condition information system also includes an alert system communicatively coupled to the ground surface condition determination system and operable to provide, responsive to a signal from the ground surface condition determination system, a notification perceivable by a vehicle occupant and indicative of the condition of the portion of the ground surface adjacent the door opening of the vehicle.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Embodiments described herein relate to a ground surface condition information system for a vehicle. The information system includes one or more types of sensors configured to acquire information relating to a specific portion of a ground surface residing just outside and below a door opening of the vehicle. This portion of the ground surface may be, for example, onto which a vehicle occupant would step when leaving the vehicle, or over which a vehicle door would swing when opening. A computing system processes the acquired sensor information to determine if any of several predetermined conditions exist on the portion of ground surface. Non-exclusive examples of such conditions may be a patch of ice, a pothole, and a concrete parking bumper. If one or more of the predetermined conditions are detected, the computing system may control portions of the vehicle to trigger an alert (for example, a sound and/or a visual display) that is perceivable by a vehicle occupant. The alert may be configured to alert the occupant of the detected ground surface condition and the location of the condition prior to, for example, opening the vehicle door and/or exiting the vehicle. Depending on the detected condition and occupant preferences, the occupant may elect to avoid the condition by exiting the vehicle through an alternative door opening or waiting to exit until the vehicle is repositioned to where the detected condition is not present below the door opening.

Figure 1:
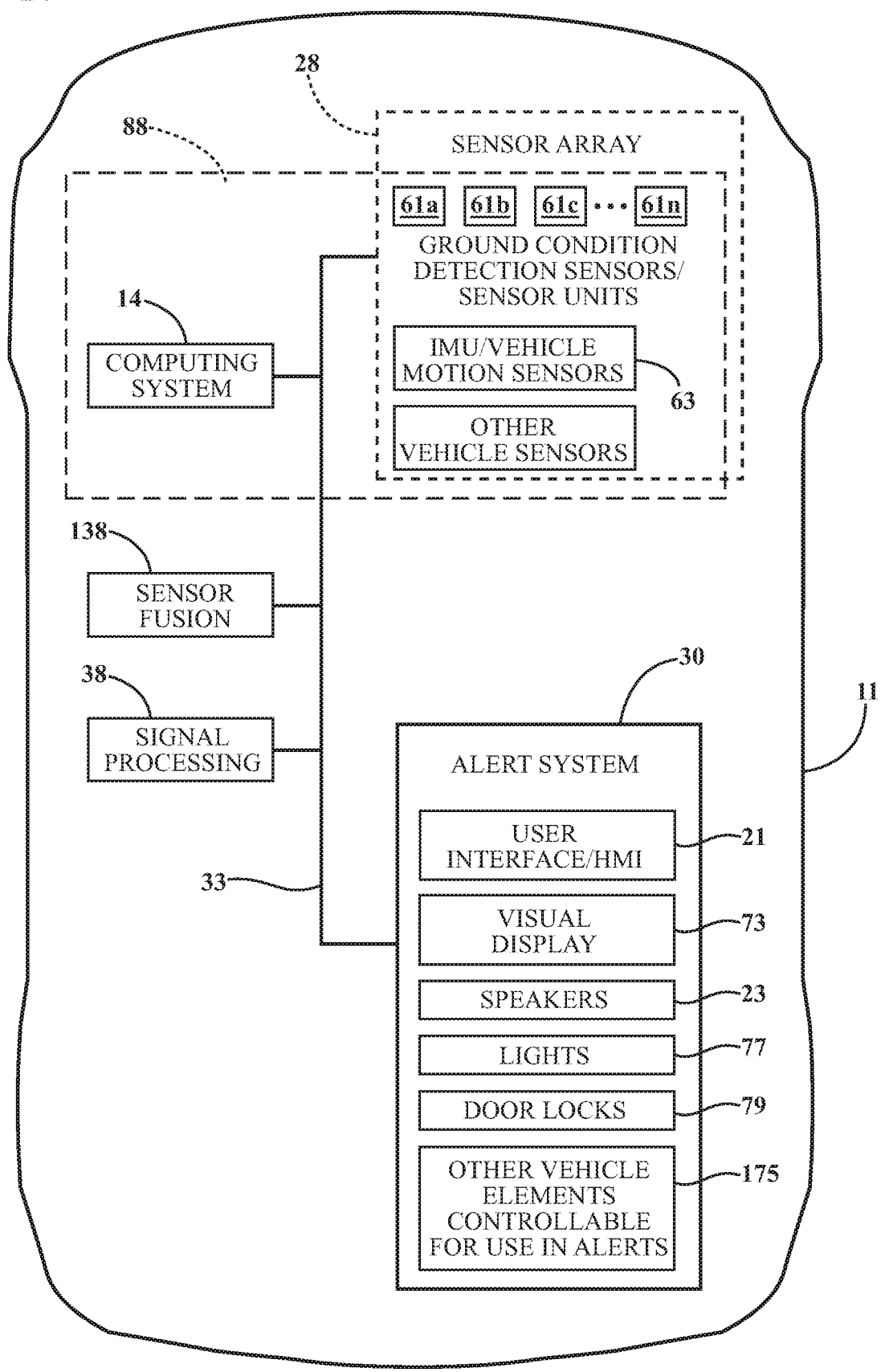
FIG. 1 is a functional block schematic diagram of a vehicle incorporating a ground surface condition information system in accordance with an embodiment described herein.

FIG. 1 is a functional block schematic diagram of a vehicle 11 incorporating a ground surface condition information system in accordance with an embodiment described herein. The vehicle 11 may take the form of a car, truck, or any other vehicle capable of performing the operations described herein. The vehicle 11 may include various systems, subsystems and components in operative communication with each other, such as a sensor system or array 28, a computing system 14, a human-machine interface (HMI) 21, an alert system 30, a ground surface condition determination system (generally designated 88) and other systems and components needed for operating the vehicle as described herein. The vehicle 11 may include more or fewer system or subsystems than those shown in FIG. 1, and each subsystem could include multiple elements. Further, each of the subsystems and elements of vehicle 11 may be interconnected. Performance of one or more of the described functions of the vehicle 11 may be executed by multiple vehicle systems and/or components operating in conjunction with each other.

In one or more arrangements, the ground surface condition information system may include a ground surface condition determination system 88 configured to determine a condition of a portion of a ground surface 51 (FIGS. 3, 4) adjacent at least one door opening of the vehicle 11. The ground surface condition information system may also include an alert system (generally designated 30) communicatively coupled to the ground surface condition determination system 88.

Figure 2:
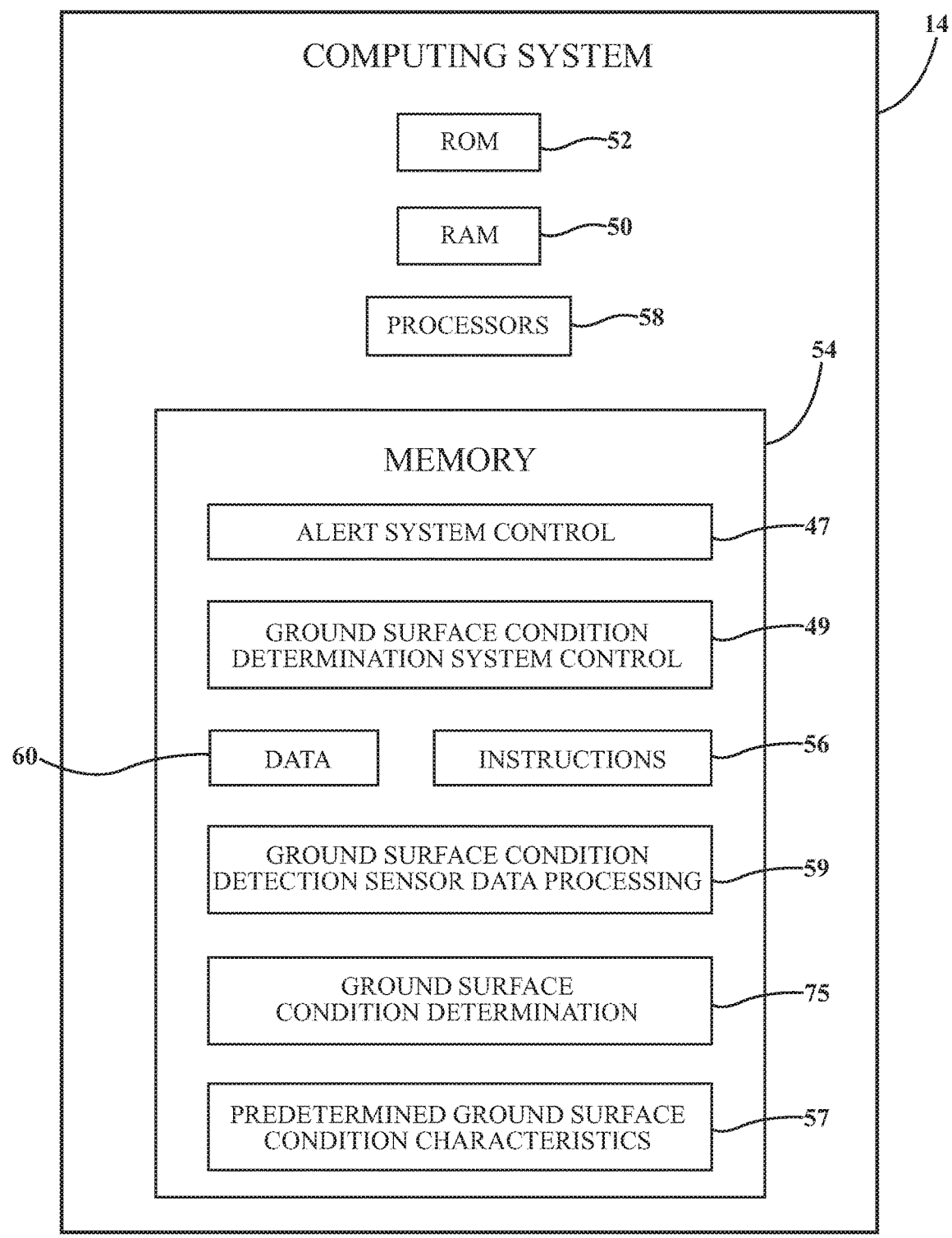
FIG. 2 is a block diagram of an embodiment of a vehicle computing system that may be used according to one or more illustrative embodiments of the disclosure.

Referring to FIG. 2, the ground surface condition determination system 88 may include at least one computing system or device 14 communicatively coupled to one or more vehicle sensors and also to other vehicle systems and elements. FIG. 2 is a block diagram of an embodiment of a vehicle computing system 14 that may be used according to one or more illustrative embodiments of the disclosure. Computing system 14 may be configured so as to affect control and operation of the vehicle 11 and its components as described herein. The computing system 14 may control the functioning of the vehicle 11 based on inputs and/or information received from various subsystems (e.g., sensor system 28) and/or from any other suitable source of information. The computing system 14 may have some or all of the elements shown in FIG. 2. In addition, the computing system 14 may also include additional components as needed or desired for particular applications. In one or more arrangements, the computing system 14 may be a main computing system of the vehicle 11.

The computing system 14 may include one or more processors 58 for controlling overall operation of the computing system 14 and its associated components, including RAM 50, ROM 52, computer-readable storage or memory 54, and any other components. Processors 58 may also be configured to control various other elements and operations of the vehicle 11. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, controllers, microcontrollers, DSP processors, and other circuitry that can execute software. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11.

Computing system 14 may also be configured to receive and store information from the sensor array 28 and/or from any other vehicle components pertaining to operation of the vehicle. The computing system 14 may also be configured to receive and store the information so that all of the information is time-correlated and may be processed for diagnostic purposes.

Computing system 14 may execute instructions stored in a non-transitory computer readable medium, such as memory 54. In the context of this document, a computer-readable storage medium may be any tangible medium that can contain or store a program for use by or in connection with an instruction execution system, apparatus, or device. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The memory 54 may contain data 60 and/or instructions 56 (e.g., program logic) executable by the processor(s) 58 to execute various functions of the vehicle 11. The memory 54 may contain instructions to transmit data to, receive data from, interact with, or control one or more of the vehicle systems and/or components described herein (for example, HMI 21, sensor system 28, and other systems and/or components).

The computing system 14 may be configured to coordinate control of the various actuatable vehicle systems and components so as to operate the vehicle as described herein. Computer-readable instructions for controlling operation of the vehicle may be stored in memory 54 and/or in other memories and implemented in the form of computer-readable program code that, when executed by a processor, implement one or more of the various processes, instructions or functions described herein. Any of the various capabilities described herein may be embodied in software, suitable hardware, and/or a combination of both hardware and software. Further, in one or more arrangements, the hardware and/or software elements configured for performing particular functions or embodying certain capabilities described herein may be distributed among a plurality of elements and/or locations. In addition to computing system 14, the vehicle may incorporate additional computing systems and/or devices (not shown) to augment or support the functions and/or capabilities embodied in computing system 14, or for other purposes.

The computing system 14 may be configured to receive data and information from the ground surface condition detection sensors to process the received data and information to determine the condition of the ground surface adjacent an opening of the vehicle 11. Information from sensors and other sources in the vehicle and exterior to the vehicle may be processed and used to control various vehicle systems and components. For example, various ground surface condition sensors may be provided to supply information to the computing system 14 to enable the computing system to process the ground surface condition information in accordance with stored processor-executable instructions, and to formulate appropriate control commands to the alert system 30 described herein. The computing system 14 may continuously receive and process an ongoing or continuous flow of information from sensor system 28, ground surface condition sensors (or sensor units 61 if the sensors are incorporated into sensor units), and from other information sources. This information may be processed and/or evaluated in accordance with instructions stored in a memory, in a manner and for the purposes described herein. The use of "continuously" when referring to the reception, gathering, monitoring, processing, and/or determination of any data, information or other parameters described herein means that the computing system 14 is configured to receive and/or process any information relating to these parameters as soon as the information exists or is detected, or as soon as possible in accordance with sensor acquisition and processor processing cycles.

The computing system 14 may be taught or otherwise configured to detect and recognize any of a variety of predetermined ground surface conditions. The "ground surface conditions" which the computing system is configured to determine may include substances covering the portion of the ground adjacent the door opening; objects positioned on or extending above the portion of the ground (for example, a curb, a post, or a concrete parking bumper); elevations, depressions, and otherwise uneven terrain; and other features. The predetermined conditions may include ice and black ice, water, oil or other fluids, potholes, slush, mud, tripping hazards (such as rocks and parking bumpers) and other features. The ground surface may be a paved road or an off-road surface, such as grass or gravel. Characteristics off the ground surface conditions may be stored in memory 54 for comparison with processed or unprocessed ground surface condition sensor data.

Figure 6A:
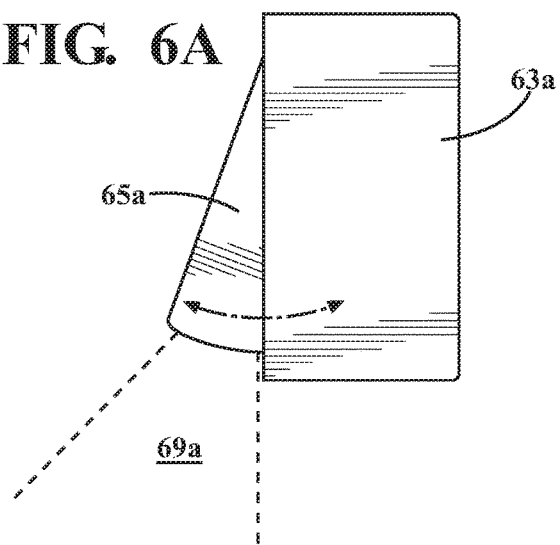
FIG. 6A is a schematic plan view of a deployable sensor unit in accordance with an embodiment described herein.
Figure 6B:
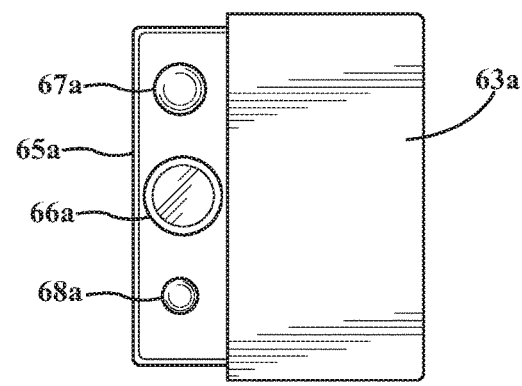
FIG. 6B is a schematic front view of the deployable sensor unit shown in FIG. 6A.

The computing system 14 may be configured with a ground surface condition determination system control capability (generally designated 49) for controlling operations of the ground surface condition determination system 88. For example, referring again to FIG. 1, the computing system 14 may be configured to control deployment and/or operation of the ground surface condition detection sensors in sensor units 61. "Sensor deployment" refers to reconfiguring a sensor between a stowed condition and a condition suitable for use in acquiring information relating to the condition of the ground surface adjacent an opening of the vehicle 11. For example, in a sensor unit with a sensor that is rotatable or otherwise movable between a deployed position and a stowed position as shown in FIGS. 6A-6B, the computing system may control movement of the sensor to deploy the sensor from a housing and to stow the sensor in the housing. In a sensor unit having a door operable to open and close a housing of the sensor, the computing system may control operation of the door to open the door to deploy the sensor, and to close the door to stow the sensor.

In one or more arrangements, the computing system 14 may be configured to operate the sensor units 61 to deploy associated ground condition detection sensors when the vehicle stops and to maintain the sensors in deployed conditions while the vehicle is stationary. The computing system 14 may also be configured to operate the sensor units 61 to close or stow the sensors when the vehicle 11 starts moving and to maintain the sensors in stowed conditions while the vehicle is moving. The state of movement of the vehicle (stationary or in motion) may be detected by a vehicle inertial measurement unit (IMU) 63 or other motion sensor in operative communication with computing system 14.

The computing system 14 may be configured with ground surface condition detection sensor data processing capabilities (generally designated 59), to process information acquired by one or more sensors (such as sensors incorporated into ground condition detection sensor units 61) relating to the condition of a portion of the ground surface adjacent a door opening of the vehicle 11. In one or more arrangements, the ground surface condition detection sensor data processing capabilities 59 may be embodied in computer-executable instructions for processing data from the various types of ground surface condition detection sensors used to acquire information relating to ground conditions adjacent the vehicle door opening. These capabilities may use known algorithms and techniques to process ground condition information acquired by the various sensors and/or sensor units 61. For example, the computing system 14 may be configured to perform image processing, edge detection, and/or object recognition on camera or video images acquired by cameras. In another example, for radar and lidar sensor data, the computing system 14 may be configured to perform localized lidar mapping and/or localized radar mapping of the ground surface adjacent the door opening using acquired sensor information.

The computing system 14 may be configured with a ground surface condition determination capability (generally designated 75) configured to evaluate the processed sensor information to determine the condition of the portion of the ground surface adjacent the door opening of the vehicle. The ground surface condition determination capability 75 may be embodied in computer-executable instructions for evaluating the acquired ground surface condition detection sensor information, to determine if one or more predetermined ground surface conditions exist adjacent the vehicle door openings. For evaluation purposes, the memory 54 may contain stored characteristics 57 of the various predetermined ground surface conditions for comparison with the processed sensor information. The memory 54 may also contain additional instructions not shown in FIG. 2, as necessary for performing the functions described herein.

In one or more arrangements, the computing system 14 can incorporate artificial or computational intelligence elements (e.g., neural network) and/or other machine learning algorithms to aid in interpreting sensor data and identifying ground surface conditions. The computing system 14 may be configured such that, even if an object or feature projecting above an average level of a ground surface is not specifically identified by a recognition algorithm, the presence of the object or feature may cause the computing system to control the alert system to provide an alert to a vehicle occupant.

Figure 3:
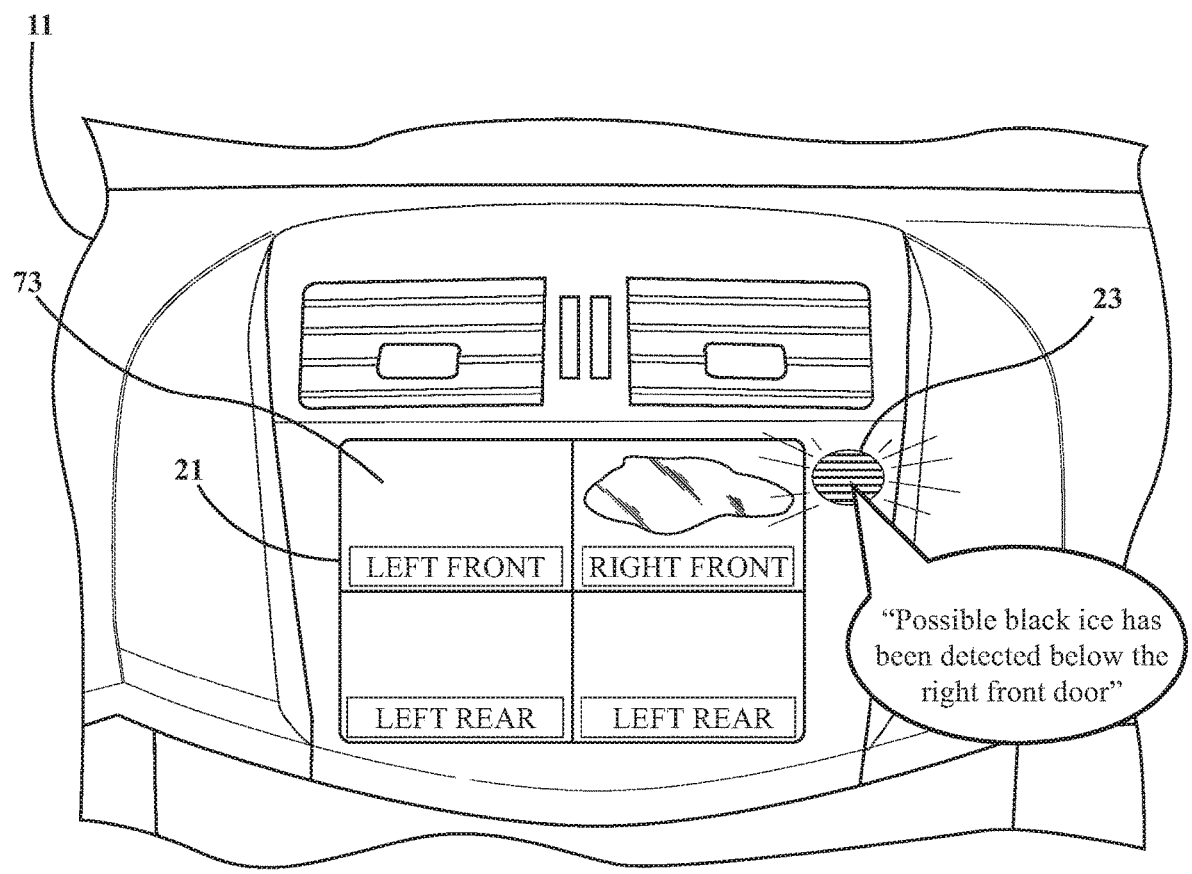
FIG. 3 is a schematic view of a portion of a vehicle interior showing a visual display operable to display images of a portion of a ground surface adjacent a door opening of the vehicle, as well as other types of information.

Referring to FIGS. 1 and 3, a human-machine interface (HMI) 21 may be operatively coupled to the computing system 14 and may be configured to enable a vehicle occupant to interface with the computing system 14. The occupant may input instructions to the computing system 14 via the HMI 21 for controlling aspects of vehicle operation. The occupant may also receive information from the computing system and/or sensors via the HMI 21. In one or more arrangements, the HMI 21 may be part of the computing system 14.

The HMI 21 may be configured to perform certain functions of the alert system 30. For example, the HMI 21 may include a display screen 73 configured to display images from ground surface condition detection cameras and other information. The display screen 73 may be in the form of a touch-screen usable for inputting instructions, for changing display formats, or for any of a variety of other purposes. As described herein, the HMI 21 may be configured to enable a user to select characteristics of alerts to be provided to the vehicle occupants upon detection of one or more predetermined ground surface conditions adjacent openings of the vehicle doors. The HMI 21 may also include one or more speakers 23 and a microphone (not shown) for conveying voice commands to the computing system 14, and for receiving audible messages generated by the computing system 14 or other elements of the vehicle.

Referring again to FIG. 1, vehicle 11 may include an array 28 of vehicle sensors designed to monitor various vehicle operational status parameters and environmental conditions external to the vehicle. Sensors of the sensor system 28 can be operatively connected to the computing system 14 and/or any other element of the vehicle 11. In a known manner, the vehicle sensors provide data used by the vehicle computing system 14 in formulating and executing control commands in the vehicle systems. For example, data from ground condition detection sensors and/or sensor units 61 may be processed in formulating and executing commands to alert system 30 to generate a user-specified type of alert relating to a condition of the ground surface adjacent a door opening of the vehicle, to alert a vehicle occupant to a possible anomalous ground surface condition adjacent the door opening. Examples (not shown) of sensors that may be incorporated into the vehicle 11 include radar and lidar systems, laser scanners, vision/camera systems, GPS systems, sensors configured to detect ambient light conditions adjacent one or more door openings of the vehicle, various inertial sensors 63 such as gyroscopes and accelerometers (which may or may not be incorporated into an inertial measurement unit (IMU) for detecting whether the vehicle is moving or stationary and for detecting characteristics of the vehicle when moving), vehicle wheel speed sensors, road condition sensors, suspension height sensors, steering angle sensors, steering torque sensors, brake pressure sensors, accelerator or pedal position sensor, and tire pressure sensors. Other types of sensors may also be included as needed to perform the various functions described herein. In arrangements in which the sensor system 28 includes a plurality of sensors, the sensors can work independently from each other. Alternatively, two or more of the sensors can work in combination with each other.

The sensor array 28 may include various types of sensors in communication with other vehicle components, for providing feedback on operations of the vehicle. For example, sensors 28 may detect and store data corresponding to the vehicle's location (e.g., GPS coordinates), speed and direction, rates of acceleration or braking, and specific instances of sudden acceleration, braking, and swerving. Vehicle sensors 28 also may include cameras and/or proximity sensors capable of recording additional conditions inside or outside of the vehicle. Sensors 28 also may detect and store data received from the vehicle's internal systems. Sensors 28 may detect and store information relating to external driving conditions, for example, external temperature, rain, snow, light levels, and sun position for driver visibility. For example, external cameras and proximity sensors, radar, lidar and other types of sensors may detect other nearby vehicles, traffic levels, road conditions, traffic obstructions, animals, cyclists, pedestrians, and other conditions.

The sensor system 28 may include a number of sensors configured to sense information about an external environment of the vehicle 11. For example, the sensor system 28 may include a navigation unit such as a Global Positioning System (GPS) and other sensors (not shown), IMU 63, a RADAR unit (not shown), a laser rangefinder/lidar unit (not shown), and one or more cameras (not shown) comprising devices configured to capture images and other information relating to the interior of the vehicle and/or an external environment of the vehicle 11. The camera(s) may be still cameras or video cameras. The MU 63 may incorporate any combination of sensors (e.g., accelerometers and gyroscopes) configured to sense position and orientation changes of the vehicle 11 based on inertial acceleration. For example, the IMU 63 may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth. The navigation unit may also be configured to determine or plan a driving route from a given start point (for example, a current location of the vehicle) to a selected destination, using stored and/or available maps, in a manner known in the art.

Other sensors are possible as well. One or more of the sensors included in the sensor system 28 may be configured to be actuated separately or collectively in order to modify a position, an orientation, or both, of the one or more sensors. Any data collected by vehicle sensors 28 may also be transmitted to any vehicle system or component requiring or utilizing the data for the purposes described herein. For example, the data collected by vehicle sensors 28 may be transmitted to computing system 14, or to one or more specialized system or component controllers (not shown). Additional particular types of sensors may include any other types of sensors needed to perform the functions and operations described herein.

Referring to FIGS. 1, 6A, and 6B, the ground surface condition determination system 88 includes at least one ground surface condition detection sensor positionable and configurable to enable the sensor to acquire information relating to the condition of the portion of the ground surface adjacent the door opening of the vehicle 11. In one or more arrangements, one or more of the ground surface condition detection sensor(s) may be incorporated into a sensor unit 61 which may include a housing structured to house and protect the sensor from damage and debris. The housing may also contain a mechanism for deploying and stowing the sensor responsive to commands from computing system 14. The ground surface conditions may be determined using data from any of various types of sensors. A ground surface condition detection sensor unit 61 may include any sensor(s) and additional elements desirable for facilitating acquisition of information relating to a specified portion of a ground surface adjacent a door opening of the vehicle 11. For example, a sensor unit may include one or more cameras, radars, proximity sensors, lidars, illumination sources, ambient light detection sensors, and other elements. The vehicle may incorporate any desired number of ground surface condition detection sensor units (for example, 61a, 61b, 61c . . . . 61n) as shown in FIG. 1.

FIGS. 6A and 6B show one example of a ground surface condition detection sensor unit 61a including a housing 63a and a rotatable sensor mount 65a including a camera 66a. FIG. 6A shows the sensor mount 65a and sensor 66a in a stowed condition, while FIG. 6B shows the sensor mount 65a and sensor 66a rotated to a deployed condition. FIG. 6C is a schematic block diagram of the sensor shown in FIGS. 6A and 6B. As stated previously, the computing system 14 may control the sensor unit 61a so as to deploy the sensor 66a when the vehicle 11 is stationary, and to stow the sensor 66a when the vehicle 11 is moving. The sensor unit 61a may house the sensor 66a and may also house other elements deployable with the sensor. For example, in a sensor unit where the sensor is a camera, the sensor unit may also include elements such as an illumination source 67a (for example, an LED light) and an ambient light sensor 68a configured for detecting an ambient light level on and around the portion of the ground surface adjacent the vehicle door opening. The illumination source 67a may be configured to be operable by the computing system 14 to activate and illuminate the portion of the ground surface adjacent the vehicle door opening, responsive detection by the ambient light sensor 68*a* of an ambient light level below a predetermined threshold. Sensor unit(s) 61 may be built into the vehicle 11 during assembly. Alternatively, one or more sensor units may be attached to the vehicle 11 as retrofits.

Figure 4:
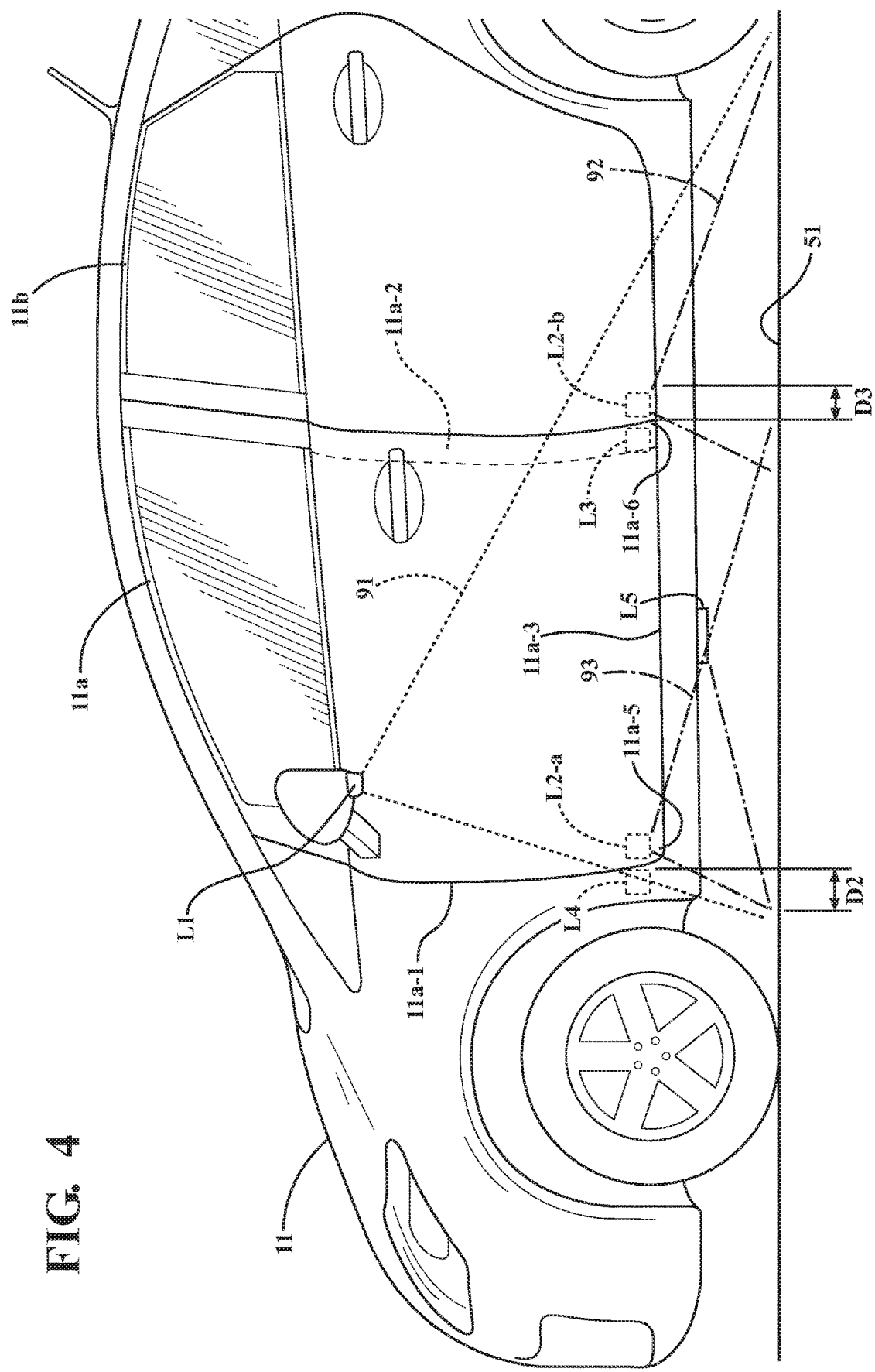
FIG. 4 is a schematic side view of a vehicle showing possible locations of ground surface condition detection sensor units.
Figure 5:
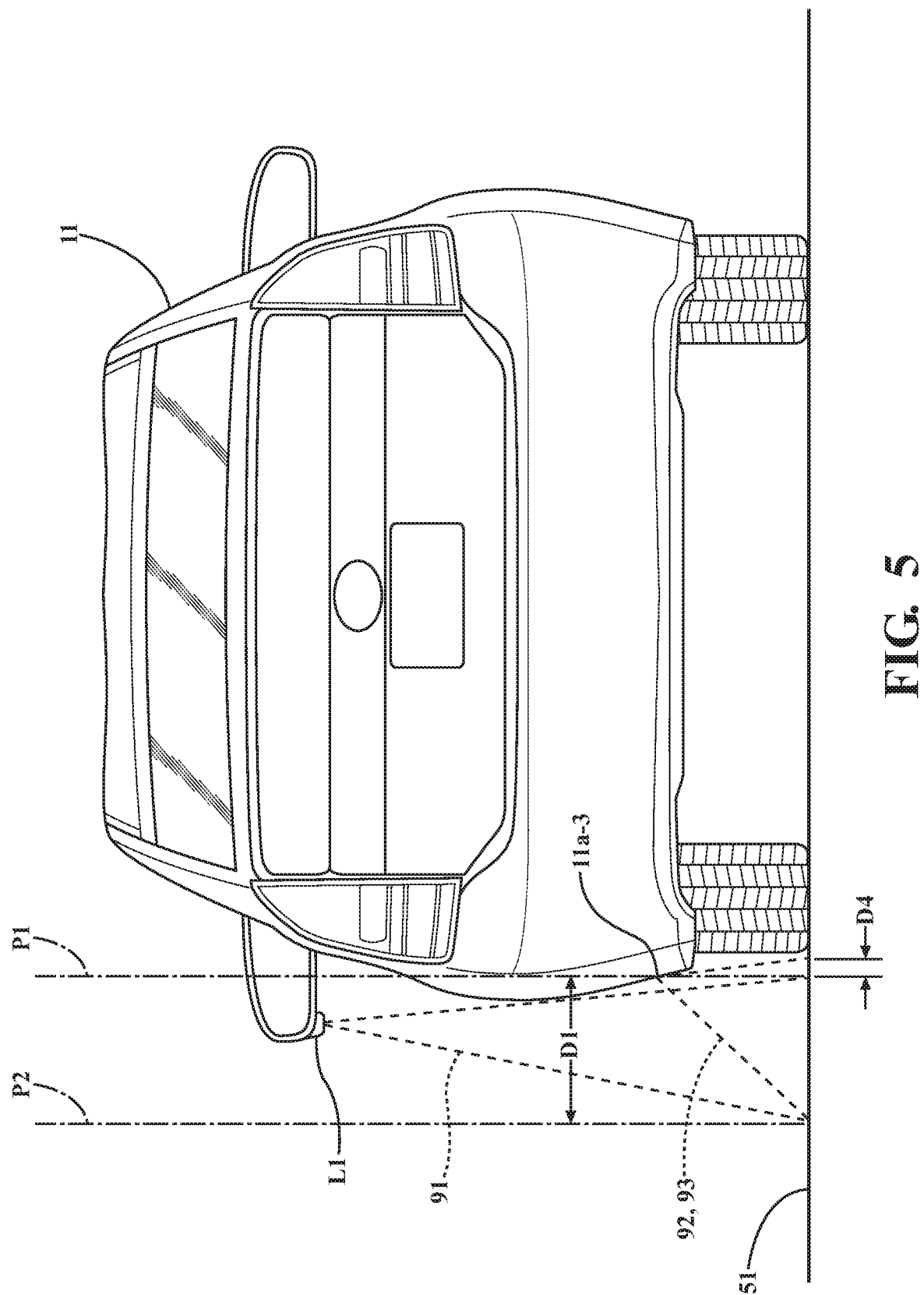
FIG. 5 is a schematic end view of the vehicle shown in FIG. 4.

FIG. 4 is a schematic side view of a vehicle 11 showing possible locations of ground surface condition detection sensor units. FIG. 5 is a schematic end view of the vehicle shown in FIG. 4. Referring to FIGS. 4 and 5, the portion of the ground surface 51 adjacent a door opening of the vehicle that is monitored by sensor(s) (i.e., the "sensor coverage zone" for the door opening) may have any desired and/or achievable size, shape and/or location.

Referring to FIGS. 4 and 5, in one or more arrangements for example, a sensor coverage zone 93 may extend outwardly from a door opening 11*a* (i.e., laterally away from the vehicle 11, in a direction perpendicular to a fore-aft axis of the vehicle (not shown)) and for a certain distance from each of the forward edge 11*a*-1 and the aft edge 11*a*-2 of the opening 11*a*. For example, in one or more arrangements, the sensor coverage zone 93 for the door opening 11*a* may extend from a vertical plane P1 passing through a bottom edge 11*a*-3 of the door opening 11*a*, at least a distance D1 laterally to another vertical plane P2 extending parallel to plane P1. The sensor coverage zone may also extend laterally inwardly in a direction toward the vehicle a distance D4 from plane P1. The sensor coverage zone 93 may also extend at least a distance D2 inches forward from a forward end 11*a*-5 of the door opening bottom edge 11*a*-3, and at least a distance D3 rearwardly from a rear end 11*a*-6 of the door opening bottom edge 11*a*-3. In particular embodiments, the distance D1 may be two feet, the distance D2 may be six inches, and the distance D3 may be six inches.

In another example, as seen in FIGS. 4 and 5, an extended coverage zone 91 may be provided by a sensor unit located in location L1 (on a side mirror of the vehicle 11). The zone 91 may cover the entire side of the vehicle.

A sensor/sensor unit may be secured at any location on the vehicle 11 from which the desired sensor coverage zone may be provided for one or more given door openings. For example, referring to FIGS. 4 and 5, a sensor/sensor unit may be positioned on a side mirror of the vehicle 11 (for example, at location L1), along a bottom edge of a door mounted so as to close the door opening (for example, locations L2-*a* and L2-*b*), along an A, B, or C pillar of the vehicle (for example, at location L3), on a body panel of the vehicle (for example, location L4), or below the door opening along an underside of the vehicle (for example, location L5). Other locations are also possible. FIG. 4 shows exemplary sensor coverage zones 92 and 93 for ground surface condition detection sensor units positioned at locations L2-*a* and L2-*b* along forward portions of associated vehicle doors. For example, the sensor unit providing coverage zone 93 may be positioned along a lower edge of the left front door, and may cover the ground surface adjacent the door opening 11*a*. The sensor unit providing coverage zone 92 may be positioned along a lower edge of the left rear door, and may cover the ground surface adjacent the door opening 11*b*. As seen in FIG. 4, the sensors may be positioned so that the ground surface condition detection sensor coverage zone overlap (as seen in FIG. 4 with zones 92 and 93), to help ensure adequate sensor coverage of pertinent portions of the ground surface. If positioned on the side mirror, the sensor/sensor unit may be located far enough from the side of the vehicle and high enough off of the ground surface 51 so that the sensor coverage zone 91 may extend along an entire side of the vehicle, as shown in FIGS. 4 and 5.

The sensor/sensor unit(s) 61 may be mounted so as to face downwardly or otherwise as needed for acquiring information relating to the desired sensor coverage zone. Depending on the location of a sensor/sensor unit on the vehicle, one or more sensor sensor units may be positioned so as to face rearwardly, to help protect the sensor/sensor unit from snow, tire spray, debris, etc. Alternatively, one or more sensor/sensor units may face in a forward direction.

Figure 7:
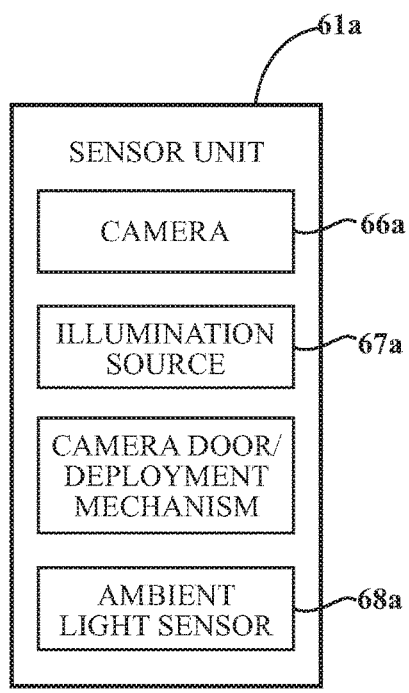
FIG. 7 is a block schematic diagram of the sensor unit shown in FIGS. 6A and 6B.
Figure 8:
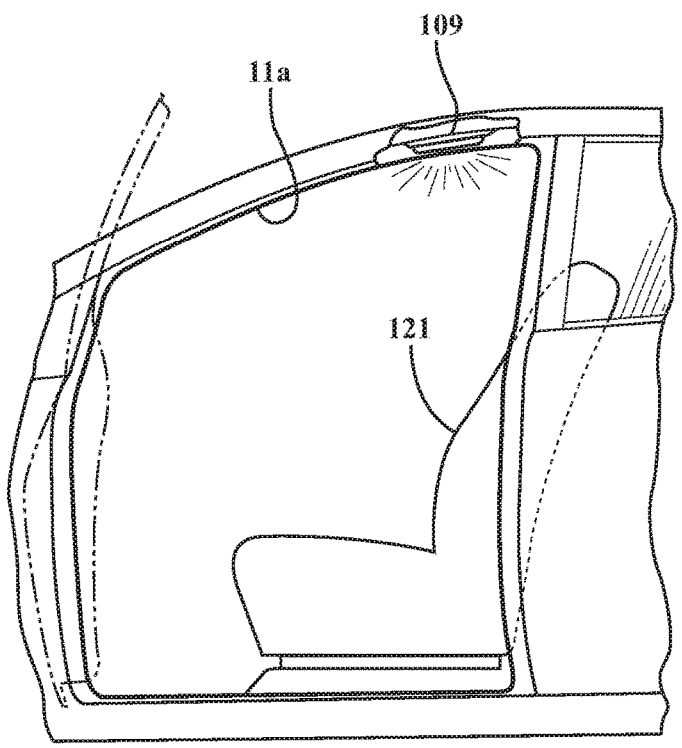
FIG. 8 is a side view of a portion of an interior of a vehicle showing an alert light positioned over a door opening of the vehicle adjacent a vehicle seat.

Referring to FIGS. 6A and 6B, in one or more arrangements, the sensor unit 61 comprises a sensor mounting 65*a* including at least one camera 66*a* positionable and configurable to image a portion of ground surface adjacent the door opening of the vehicle 11. A sensor is considered to be positionable and configurable to image the desired portion of the ground surface when the sensor can be secured to the vehicle in a location where the sensor can acquire information on the desired portion of the ground surface when the sensor is deployed. FIG. 7 is a block schematic diagram of the sensor unit shown in FIGS. 6A and 6B.

In one or more arrangements, where the sensor is a camera as shown in FIGS. 6A and 6B, the sensor unit may include an illumination source 67*a* configured for deployment with the camera 66*a*, and configured to illuminate the portion of the ground surface adjacent the door opening of the vehicle 11. In one or more arrangements, a sensor unit may also include an ambient light detection sensor 68*a* communicatively coupled to the illumination source 67*a* and configured to determine a level of ambient light in the vehicle exterior environment in and around the portion of the ground surface adjacent the door opening. The illumination source 67*a* may be operated to provide additional light for the camera in low-ambient light conditions. The illumination source 67*a* may be configured to be operable responsive to the level of ambient light in the vehicle environment as determined by the ambient light detection sensor 68*a*. For example, FIGS. 6A and 6B show an example of a sensor unit 61*a* including camera 66*a*, illumination source 67*a*, and ambient light detection sensor 68*a* which are simultaneously deployable.

Ground surface condition detection sensor units 61 may incorporate conventional cameras (with or without telescoping lenses), 3-D or stereoscopic cameras, thermographic cameras, or any other type of camera usable for providing information regarding the condition of the portion of the ground surface adjacent a vehicle door opening. In addition, as well as cameras, other types of sensors may be used to detect characteristics of the ground surface adjacent the vehicle door opening(s). For example, radar, lidar, other types of proximity sensors (for example, ultrasonic sensors), and any other type of sensor may be employed to acquire information relating to the portion of the ground surface adjacent the door opening.

In one or more arrangements, a plurality of sensor/sensor units may be mounted on the vehicle 11, so as to provide information relating to portions of the ground surface adjacent each door opening of the vehicle. For example, the ground surface condition determination system 88 may include a plurality of camera units, with each camera unit including at least one camera positionable and configurable to image a portion of a ground surface adjacent an associated door opening of the vehicle.

In one or more arrangements, a sensor unit including a camera unit may also include an image processor incorporated into the camera unit and configured to receive image data from the camera and to process the image data, to determine the condition of the ground surface adjacent the door opening of the vehicle.

In one or more arrangements, the ground surface condition determination system 88 includes a plurality of sensors, with each sensor configured to acquire information relating to a portion of the ground surface adjacent a different door opening of the vehicle. For example, as shown in FIG. 4, a sensor unit positioned at location L2-*a* may have a coverage zone 93 covering a portion of the ground surface below a front door opening 11*a*, while a sensor unit positioned at location L2-*b* may have a coverage zone 92 covering a portion of the ground surface below a rear door opening 11*b*.

In one or more arrangements, the ground surface condition determination system may include a plurality of different types of sensors, with each sensor of the plurality of sensors being positionable and configurable to enable the sensor to acquire information relating to a condition of the same portion of a ground surface adjacent an associated door opening of the vehicle. Stated another way, different types of sensors (for example, a conventional camera and a radar sensor) may be configured to provide information on the same portion of the ground surface adjacent a door opening. In addition, the computing system 14 of the ground surface condition determination system may be configured to process information acquired from each different type of sensor relating to the condition of the portion of the ground surface adjacent the associated door opening of the vehicle. The use of different types of sensors to acquire data on a single portion of the ground surface may enable the detection of different types of ground surface conditions. For example, localized terrain mapping using a radar sensor may provide information that may not be registered in the camera image. This may enable a more accurate identification of a predetermined ground surface condition and/or its characteristics. In another example, a conventional and a thermographic camera focused on the same portion of ground surface may each provide different information relating to the portion of the ground surface. Referring to FIG. 4, in one example, such a use of different types of sensors may be provided if the sensor/sensor unit located at location L1 is a conventional camera and the sensor/sensor unit located at location L2 is a radar sensor.

The vehicle 11 may include a suitable signal processing means 38 for situations where a sensor output signal or other signal requires pre-processing prior to use by the computing system 14 or another vehicle system or element, or where a control signal sent from the computing system will require processing prior to use by actuatabie sub-systems or sub-system components (for example, components of the steering system or throttle system). The signal processing means may be an analog-to-digital (AD) converter or digital-to-analog (D/A) converter, for example.

If computing system 14 requires for processing an integrated or composite signal formed from outputs of multiple individual sensors, the vehicle 11 may incorporate a known sensor fusion means 138 (incorporating, for example, a suitable Kalman filter and/or another element incorporating or embodying a suitable sensor fusion algorithm) in communication with other pertinent vehicle systems, such as computing system 14, sensor system 28, and other vehicle systems. The sensor fusion means 138 may process data received from the various vehicle sensors to generate an integrated or composite signal (formed, for example, from outputs of multiple individual sensors). The sensor fusion means 138 may further provide various assessments based on data from the sensor system 28. In an example embodiment, the assessments may include evaluations of individual objects or features in the environment of the vehicle 11, evaluation of a particular situation, and evaluation of possible impacts based on the particular situation. Other assessments are also possible. The sensor fusion means 138 may be stored on a memory (such as memory 54) incorporated into or in operative communication with computing system 14, and may be operated by the computing system in a manner known in the art. Also, if a sensor output signal requires pre-processing prior to use by a controller or computing system, a known pre-processing means (not shown) (for example, an A/D converter) may be in communication with other pertinent vehicle systems, such as computing system 14, sensor system 28, and other vehicle systems. Similarly, if operation of any actuatable sub-system components or other vehicle components will require processing of a control signal received from a controller, a known post processing means (for example, an D/A converter) may be provided in communication with other pertinent vehicle systems, such as computing system 14, sensor system 28, and other vehicle systems.

The vehicle 11 may be configured so that the various controllers, sensors and other elements of the system can communicate with each other using a controller area network (CAN) bus 33 (FIG. 1) or the like. Via the CAN bus and/or other wired or wireless mechanisms, the computing system 14 may transmit messages to various devices in the vehicle and/or receive messages from the various devices, e.g., controllers, actuators, sensors, etc. Alternatively, any of the elements and/or systems described herein may be directly connected to each other without the use of a bus. Also, connections between the elements and/or systems described herein may be through another physical medium (such as wired connections), or the connections may be wireless connections.

Alert system 30 may be communicatively coupled to the ground surface condition determination system 88 and may be operable to provide, under control of the ground surface condition determination system 88, a notification perceivable by a vehicle occupant and indicative of the condition of the portion of the ground surface adjacent the door opening of the vehicle. The computing system 14 may be configured to control an operation of the vehicle to provide the notification if the computing system 14 determines that one or more predetermined conditions exist on a portion of the ground surface adjacent a door opening. Control signal(s) from the computing system 14 may control and/or operate elements of the alert system 30 so as to provide the notification or alert perceivable by an occupant of the vehicle and indicative of the condition of the portion of the ground surface adjacent the door opening of the vehicle.

In one or more arrangements, the characteristics of the message or alert generated by the alert system may be specified by a vehicle occupant prior to determination of a predetermined condition of the portion of the ground surface adjacent the door opening. The characteristics of the message or alert may be specified by an occupant using the HMI (via a touch-screen interface, for example), and may be varied according to the condition of the portion of the ground surface adjacent the door opening. For example, a first type of alert (e.g., flashing lights in combination with a first type of sound) may be provided responsive to detection of ice on a road surface below the door opening, and a second type of alert (e.g., flashing lights in combination with a second type of sound) may be provided responsive to detection of a parking bumper on the road surface below the door opening. A vehicle occupant may select characteristics of an alert from a variety of options including different sound volumes, different sound frequencies, intermittent sounds, display options colors, flashing lights, etc), and/or operation of various portions of the vehicle to indicate a detected condition of the ground surface.

For embodiments where the sensor/sensor unit includes a camera, the alert system may incorporate a visual display operable to display an image of the portion of the ground surface adjacent the door opening of the vehicle. As shown in FIG. 3, the visual display 73 may be a part of an existing HMI 21 of the vehicle. Alternatively, the display 73 may be a dedicated display separate from the HMI. The computing system 14 may be configured to control operation of elements of the vehicle so as to display an image of each portion of the ground surface covered by the camera, to enable a vehicle occupant to view the condition of the ground surface. The displayed image may be perceivable by an occupant of the vehicle and may be displayed after the computing system has determined the existence or probable existence of one of the predetermined conditions of the portion of the ground surface adjacent the door opening.

In one or more arrangements, the computing system 14 is configured to generate a text string relating to the condition of the portion of the ground surface adjacent the door opening of the vehicle. The computing system may be configured to operate the visual display 73 to display the text string on the visual display 73. Text strings alerting an occupant of each type of predetermined condition may be stored in a library in memory. The computing system 14 may then control the display 73 to show the appropriate text string when the predetermined condition has been determined.

In one or more arrangements, in an embodiment where the ground surface condition determination system 88 includes multiple cameras, the computing system 14 may be configured to process images acquired from each camera unit to determine the condition of the ground surface adjacent an associated door opening of the vehicle. The computing system 14 may be configured to operate the visual display 73 to simultaneously display an image of the ground surface adjacent each door opening provided by an associated camera unit of the plurality of camera units. One example of such an arrangement is shown in FIG. 3, where separate camera units are configured to cover the ground surface adjacent the left front, left rear, right front, and right rear door openings of the vehicle. The individual portions of the screen may be labeled as shown. Alternatively, the camera feeds may be arranged on the screen as show without accompanying text for a vehicle with four doors, so as to provide an arrangement intuitively understandable by a vehicle occupant.

In one or more arrangements, the computing system may be configured to control operation of the display shown in FIG. 3 so that images are shown only on portions of the screen corresponding to camera(s) which actually detect a predetermined condition. Thus, for example, if a predetermined condition is detected by a camera covering a portion of the ground surface below the right front door, a corresponding portion of the display screen would display an image of this portion of the ground surface. The remaining portions of the screen may be blank. This aspect may serve to focus the attention of an occupant on the area or areas containing the predetermined condition(s).

In one or more arrangements, the computing system 14 may be configured to control the vehicle door locks 79 to temporarily lock a door positioned in the door opening of the vehicle responsive to determination of a predetermined condition of the portion of the ground surface adjacent the door opening. The locking of the door may by accompanied by another alert characteristic (such as a flashing light positioned above the door opening, for example) indicating that a condition warranting occupant awareness has been detected outside the door, to allow an occupant to further investigate the condition prior to exiting the vehicle through the door opening, and to generally increase occupant awareness of the detected condition. Locking of the door may occur simultaneously with activation of a visual and/or audible alert. The locked door may be manually unlocked at any time by a vehicle occupant.

In one or more arrangements, the computing system 14 may be configured to control operation of at least one light source 77 configured to be perceivable by an occupant of the vehicle, responsive to determination of a ground surface condition adjacent a door opening of the vehicle. In one example, the light source may be located above the door of the vehicle, and may be controlled to flash or activate responsive to detection of one of the predetermined conditions on a ground surface outside the door. In another example, the light source may be located on (or may be part of) a visual display on HMI 21, and may be configured to flash responsive to detection of one of the predetermined conditions.

In one or more arrangements, the computing system 14 may be configured to control operation of at least one sound source of the vehicle so as to provide a sound perceivable by an occupant of the vehicle, responsive to determination of one or more of the predetermined conditions on the ground surface by the computing system. Different sounds may be selectable by an occupant to signify different detected predetermined conditions of the ground surface. The sounds may be projected trough any suitable medium, for example, through existing vehicle audio speakers 23 or through speakers dedicated for the purpose of notifying the occupant of the predetermined ground surface conditions.

In one or more arrangements, the transmitted sounds may include verbal phrases or spoken words indicative of the detected predetermined condition of conditions. For example, as shown in FIG. 3, a verbal message such as "possible black ice has been detected below the right front door" may be transmitted through he vehicle speakers 23 to the vehicle interior. The sounds or a verbal message may be conveyed to the occupant simultaneously with display of the pertinent portion of the ground surface in visual display 73. Verbal messages alerting an occupant of each type of predetermined condition may be pre-recorded and stored in a library in memory. The computing system 14 may then transmit the appropriate verbal message when the predetermined condition has been determined. Also, additional elements of the vehicle 11 may be controllable by the computing system 14 for use in providing an alert to a vehicle occupant.

As will be appreciated by one skilled in the pertinent the art upon reading the preceding disclosure, various aspects described herein may be embodied as a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing system for a vehicle, the computing system comprising one or more processors for controlling operation of the computing system, and a memory for storing data and program instructions usable by the one or more processors, wherein the one or more processors are configured to execute instructions stored in the memory to:
    process sensor information to determine a condition of a portion of a ground surface adjacent at least one door opening of the vehicle; and
    responsive to determination of the condition of the portion of the ground surface, control at least one ground surface condition detection sensor so as to deploy the at least one sensor when the vehicle stops moving and stow the at least one sensor when the vehicle starts moving.

2. The computing system of claim 1 wherein the one or more processors are configured to execute instructions stored in the memory to lock a door positioned in the at least one door opening of the vehicle responsive to determination of a condition of a plurality of predetermined conditions of the portion of the ground surface adjacent the at least one door opening of the vehicle.

3. The computing system of claim 1 wherein the one or more processors are configured to execute instructions stored in the memory to control operation of at least one light source configured to be perceivable by an occupant of the vehicle, responsive to determination of a condition of a plurality of predetermined conditions of the portion of the ground surface adjacent the at least one door opening of the vehicle.

4. The computing system of claim 1 wherein the one or more processors are configured to execute instructions stored in the memory to control operation of a visual display configured to be perceivable by an occupant of the vehicle, responsive to determination of a condition of a plurality of predetermined conditions of the portion of the ground surface adjacent the at least one door opening of the vehicle.

5. The computing system of claim 1 wherein the one or more processors are configured to execute instructions stored in the memory to control operation of at least one sound source of the vehicle so as to provide a sound configured to be perceivable by an occupant of the vehicle, responsive to determination of a condition of a plurality of predetermined conditions of the portion of the ground surface adjacent the at least one door opening of the vehicle.

6. The computing system of claim 1 wherein the one or more processors are configured to execute instructions stored in the memory to control an operation of the vehicle responsive to determination of a condition of a plurality of predetermined conditions of the portion of the ground surface adjacent the at least one door opening of the vehicle, in accordance with instructions received from a user prior to determination of a condition of a plurality of predetermined conditions of the portion of the ground surface adjacent the at least one door opening of the vehicle.

7. A ground surface condition information system for a vehicle, the information system comprising:
    a ground surface condition determination system configured to determine a condition of a portion of a ground surface adjacent at least one door opening of a vehicle, the ground surface condition determination system including at least one ground surface condition detection sensor positionable and configurable to enable the at least one ground surface condition detection sensor to acquire information relating to the condition of the portion of the ground surface adjacent the at least one door opening of the vehicle, the at least one ground surface condition detection sensor being incorporated into a deployable sensor unit configurable so that the at least one ground surface condition detection sensor deploys when the vehicle is stops moving and the at least one ground surface condition detection sensor stows when the vehicle starts moving;
    a computing system communicatively coupled to the at least one ground surface condition detection sensor and configured to process the information relating to the condition of the portion of the ground surface adjacent the at least one door opening of the vehicle, to determine the condition of the portion of the ground surface adjacent the at least one door opening of the vehicle; and
    an alert system communicatively coupled to the ground surface condition determination system and operable to provide, responsive to a control signal from the ground surface condition determination system, a notification perceivable by a vehicle occupant and indicative of the condition of the portion of the ground surface adjacent the at least one door opening of the vehicle,
    wherein the ground surface condition determination system is configured to provide the control signal to the alert system responsive to the condition of the portion of the ground surface adjacent the at least one door opening of the vehicle.

8. The ground surface condition information system of claim 7 wherein the ground surface condition determination system includes a plurality of ground surface condition detection sensors, each ground surface condition detection sensor of the plurality of ground surface condition detection sensors being positionable and configurable to enable the sensor to acquire information relating to a condition of a portion of a ground surface adjacent an associated door opening of the vehicle, and wherein the computing system is configured to process information acquired from each ground surface condition detection sensor of the plurality of ground surface condition detection sensors relating to the condition of the portion of the ground surface adjacent the associated door opening of the vehicle, to determine the condition of the ground surface adjacent the associated door opening of the vehicle.

9. The ground surface condition information system of claim 7 wherein the alert system comprises a visual display operable to display an image of the portion of the ground surface adjacent the at least one door opening of the vehicle.

10. The ground surface condition information system of claim 9 wherein the computing system is configured to generate a text string relating to the condition of the portion of the ground surface adjacent the at least one door opening of the vehicle, wherein the computing system is configured to operate the visual display to display the text string on the visual display.

11. The ground surface condition information system of claim 9 wherein the at least one ground surface condition detection sensor comprises at least one camera unit, the at least one camera unit including at least one camera positionable and configurable to image the portion of ground surface adjacent the at least one door opening of the vehicle.

12. The ground surface condition information system of claim 11 further comprising an illumination source configured to illuminate the portion of the ground surface adjacent the at least one door opening of the vehicle.

13. The ground surface condition information system of claim 12 further comprising an ambient light detection sensor communicatively coupled to the illumination source and configured to determine a level of ambient light in the vehicle exterior environment, and wherein the illumination source is configured to be operable responsive to the level of ambient light in the vehicle environment as determined by the ambient light detection sensor.

14. The ground surface condition information system of claim 11 wherein the computing system comprises an image processor incorporated into the at least one camera unit and configured to receive image data from the at least one camera and to process the image data, to determine the condition of the ground surface adjacent the at least one door opening of the vehicle.

15. The ground surface condition information system of claim 9, wherein the ground surface condition determination system includes a plurality of camera units, each camera unit of the plurality of camera units including at least one camera positionable and configurable to image a portion of a ground surface adjacent an associated door opening of the vehicle, wherein the computing system is configured to process images acquired from each camera unit of the plurality of camera units relating to the condition of the portion of the ground surface adjacent the associated door opening of the vehicle, to determine the condition of the ground surface adjacent the associated door opening of the vehicle, and wherein the visual display is operable to simultaneously display an image of the ground surface adjacent each door opening provided by an associated camera unit of the plurality of camera units.

16. The ground surface condition information system of claim 7 wherein the ground surface condition determination system includes a plurality of ground surface condition detection sensors, the plurality of ground surface condition detection sensors including at least two different types of ground surface condition detection sensors, each ground surface condition detection sensor of the plurality of ground surface condition detection sensors being positionable and configurable to enable the ground surface condition detection sensor to acquire information relating to a condition of a portion of a ground surface adjacent a single door opening of the vehicle, and wherein the computing system is configured to process information acquired from each different type of ground surface condition detection sensor of the plurality of ground surface condition detection sensors relating to the condition of the portion of the ground surface adjacent the associated door opening of the vehicle, to determine the condition of the ground surface adjacent the associated door opening of the vehicle.

\* \* \* \* \*